INVENTOR
PATRICK H. HARRINGTON
VICTOR KLINGLER
By
ATTORNEYS

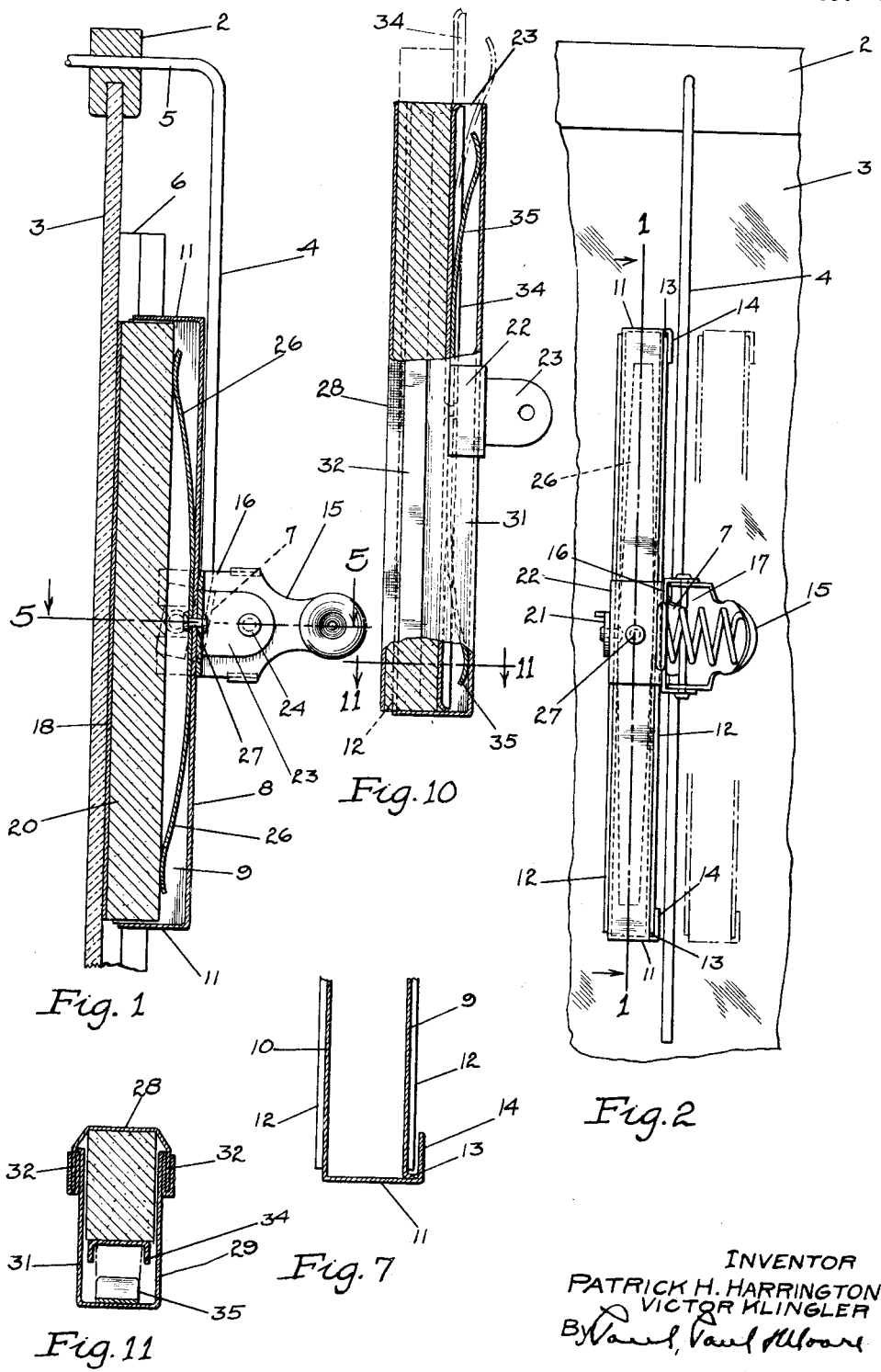
Feb. 11, 1930.   P. H. HARRINGTON ET AL   1,747,004
ATTACHMENT FOR WINDSHIELD CLEANERS
Filed Dec. 15, 1928   3 Sheets-Sheet 1
INVENTOR
PATRICK H. HARRINGTON
VICTOR KLINGLER
ATTORNEYS Feb. 11, 1930.  P. H. HARRINGTON ET AL  1,747,004
ATTACHMENT FOR WINDSHIELD CLEANERS
Filed Dec. 15, 1928   3 Sheets-Sheet 2

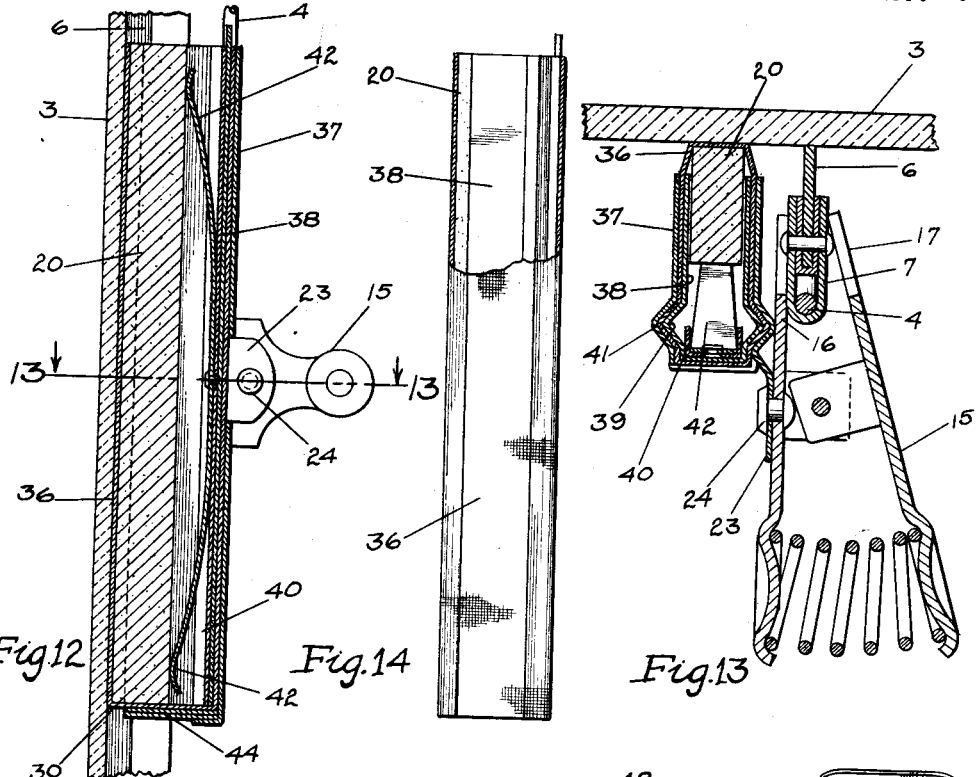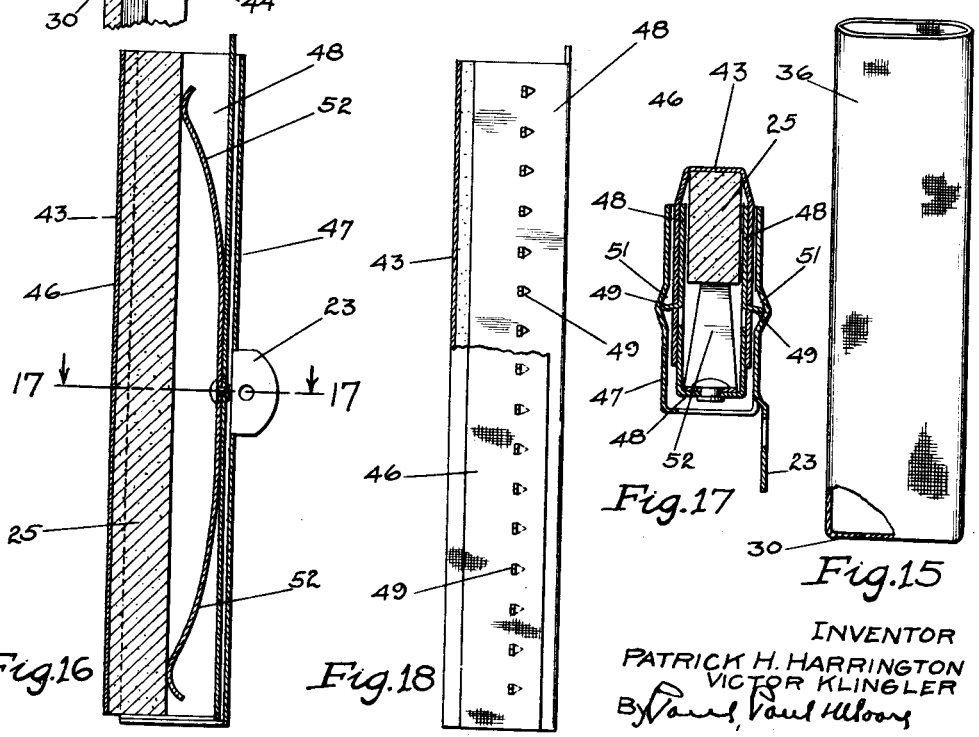

Patented Feb. 11, 1930

1,747,004

UNITED STATES PATENT OFFICE

PATRICK H. HARRINGTON AND VICTOR KLINGLER, OF SLAYTON, MINNESOTA

ATTACHMENT FOR WINDSHIELD CLEANERS

Application filed December 15, 1928. Serial No. 326,348.

This invention relates to an attachment for a windshield cleaner and is an improvement over the form shown in the pending application, Patrick H. Harrington, Serial No. 307,189, filed September 20, 1928.

An object of the present invention is to provide an attachment for a windshield cleaner comprising a holder open at one side and adapted to support a soluble body such as a salt bar, and a porous material, such as a textile fabric, being demountably secured to said holder to provide substantially a closure therefor, and adapted to contact with the glass of the windshield to prevent the salt from directly engaging the windshield glass, and means being provided for exerting a yielding pressure against said salt bar to hold it against said closure whereby the latter may be held in wiping contact with the windshield glass.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification;

Figure 1 is a vertical sectional view on the line 1—1 of Figure 2, showing a portion of a windshield and a windshield cleaner with the invention attached thereto;

Figure 2 is a vertical elevational view, showing the attachment mounted on the windshield cleaner;

Figure 7 is a detail sectional view on the line 7—7 of Figure 4;

Figure 10 is a view partially in section, showing a modified form where the fabric is secured to the holder;

Figure 11 is a cross sectional view on the line 11—11 of Figure 10, showing the opposite side edges of the fabric secured to the open side of the holder to provide a closure therefor;

Figure 12 is a view, showing another modified form where the cloth or fabric is in the form of a tubular member;

Figure 13 is a cross sectional view on the line 13—13 of Figure 12;

Figure 14 is a view showing the cloth or fabric removed from the holder and the means for retaining the salt bar therein;

Figure 15 is a view showing the tubular cloth element removed from the holder;

Figure 16 is a view showing another modification where the cloth is supported within the holder by means of a toothed member slidable therein;

Figure 17 is a cross sectional view on the line 17—17 of Figure 16; and

Figure 18 is a view showing the cloth and the toothed member removed from the holder.

Figure 3:
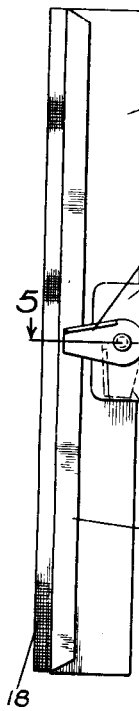
Figure 3 is a side elevation of the attachment removed from the cleaner.
Figure 4:
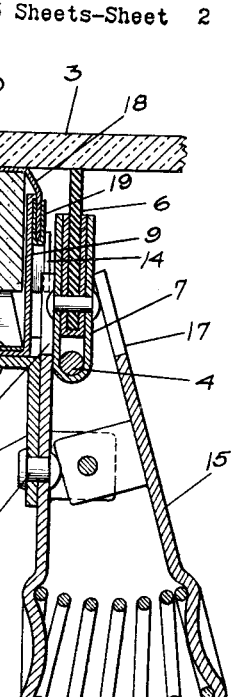
Figure 4 is a similar view, showing the opposite side of the cleaner with the fabric closure removed from the holder.

In the selected embodiment of the invention here shown, for purposes of disclosure, there is illustrated in Figures 1 and 2, a portion of a windshield comprising the usual frame 2 and glass 3. A windshield cleaner, of ordinary construction, is shown mounted upon the windshield and comprises an arm 4, here shown as having an offset portion 5, rotatably mounted in a suitable bearing provided in the frame 2 of the windshield. The usual wiper element 6 is shown in Figure 5, and is pivotally secured to the arm 4 by means of a U-shaped member 7, between whose legs the element 6 is mounted.

Figures 8, 9:
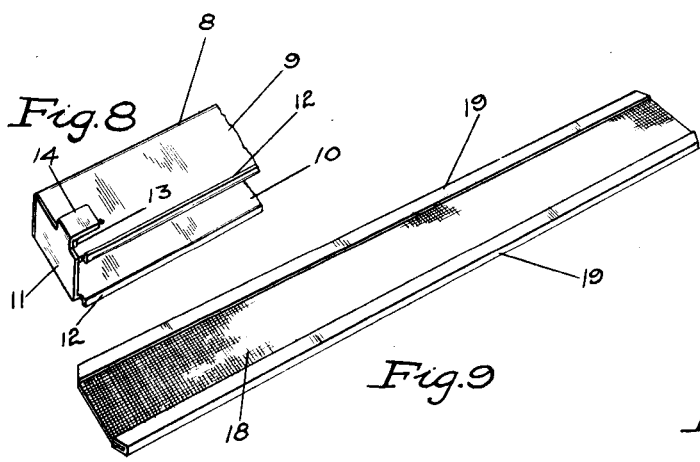
Figure 8 is a perspective view of one end of the holder, showing a means provided for retaining the closure in position thereon.
Figure 9 is a perspective view showing one form of closure removed from the holder.

The novel attachment featured in this invention comprises a holder 8 having opposed side walls 9—10 and the end walls 11. The side walls are each formed with a longitudinal rib 12, as shown in Figures 5, 6 and 8. The side walls 9 and 10 and end walls 11 are preferably formed of a single piece of sheet material, folded as best shown in Figure 8. Each end wall 11 of the holder is preferably formed with a lug 14 spaced from the side wall 9 by a flange 13, shown in Figure 7. The flanges 13 provide means for spacing the lugs 14 from the outer surfaces of the wall 9.

Figure 5:
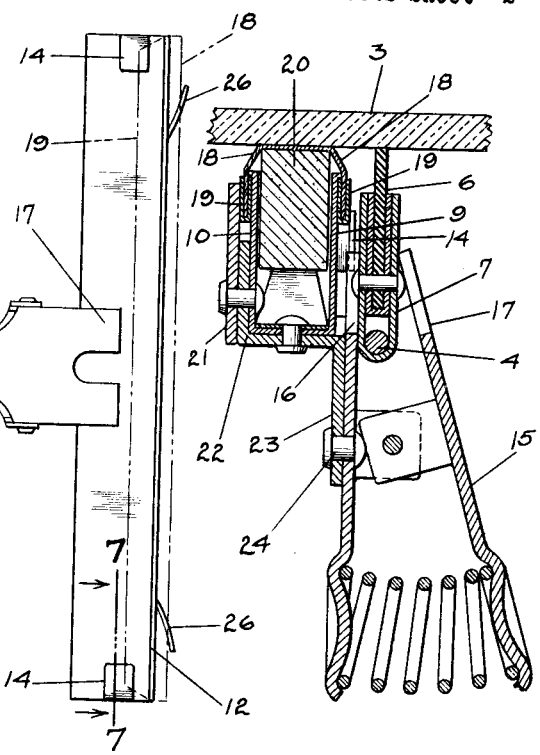
Figure 5 is an enlarged cross sectional view on the line 5—5 of Figure 3.
Figure 6:
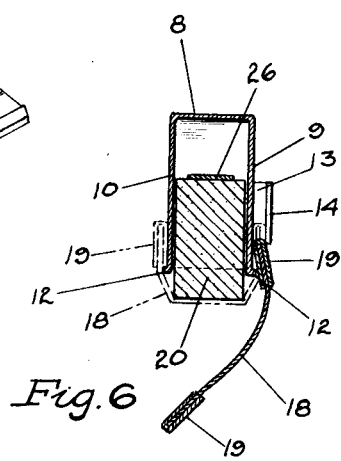
Figure 6 is an enlarged cross sectional view of the holder, showing the salt bar positioned therein and a manner of securing the fabric closure to the holder.

The means provided for detachably securing the holder 8 to the windshield cleaner, comprises a suitable clamp 15, having jaws 16 and 17 adapted to grip the cleaner as shown in Figure 5. This clamp is similar in construction to the one shown and described in the above mentioned pending application.

An important feature of this invention resides in the means provided for closing the open side of the holder 8 to prevent the salt bar 20 from directly contacting with the surface of the windshield glass. This means consists of a flexible porous closure 18, constructed of a suitable cloth or textile fabric, and provided at its opposite edges with metallic reinforcing members 19, as shown in Figures 6 and 9. This closure is here shown as being detachably secured to the holder 8 by means of the lugs 14 and longitudinal ribs 12, provided on the side walls of the holder. A small latch member 21 is pivotally mounted upon the wall 10 and has one end spaced therefrom, as shown in Figure 5. In this view, it will be noted that the latch member is seated against a plate member 22, secured to the holder and having an upstanding lug 23 to which the clamp 15 is pivotally connected by a rivet or stud 24.

To secure the closure 18 to the holder, one of the reinforcing members 19 has its ends inserted between the lugs 14 and the adjacent surface of the wall 9, as shown in Figure 6, until the member is seated flatly against the side wall 9, as indicated in dotted lines in Figure 6, and full lines in Figure 5. The opposite member 19 is then seated against the opposite wall 10 with one edge engaging the rib or flange 12, and the latch member 21 is then moved to the full line position shown in Figure 3, thereby securing the closure 18 in position upon the holder. When the closure is positioned upon the holder, as above described, and as shown in Figure 5, the inner edges of the reinforcing members 19 will be seated against the longitudinal flanges 12, which prevent the closure from becoming detached from the holder.

The soluble body 20, which preferably is made of compressed salt, may be inserted in the holder 8 before the closure is secured thereto, and is adapted to be held in yielding contact with the inner surface of the fabric closure 18 by a suitable spring 26, shown in Figure 1. This spring is preferably secured to the holder by means of a suitable rivet 27.

Figures 10 and 11 illustrate a modified construction where the fabric 28 is permanently secured to the side walls 29 and 31 of the U-shaped holder, preferably by being clamped between the folded edges of the holder, as indicated at 32 in Figure 11. When the fabric is thus permanently secured to the holder, one end of the holder is preferably open, as indicated at 33 in Figure 10, to permit the insertion of the salt bar 20 therein, and also to permit inserting into the holder, the tension means for holding the salt bar against the fabric 28. In Figure 10, there is shown a tension means comprising a channel-shaped member 34, having a flat spring 35 secured thereto, which functions to hold the member 34 in engagement with the salt bar which, in turn, holds the salt bar against the fabric 28.

Figures 12 to 15, inclusive, illustrate another modified form where the cloth or fabric is in the form of a tubular element 36, preferably closed at one end as indicated at 30, in Figure 15. This tubular element is supported within a holder 37, by means of a substantially U-shaped member 38 adapted to be slidably mounted within the holder 37 and retained therein by means of longitudinally extending ribs 39, received in correspondingly shaped recesses or grooves 41 provided in the side walls of the holder 37. A suitable spring 42 is riveted at its center to the member 38, as shown in Figure 12, and has its flexible ends adapted to engage the salt bar 20, as shown.

To assemble the device shown in Figures 12 to 15, the U-shaped member 38 is preferably first inserted into the element 36. The salt bar 20 may then be inserted into the U-shaped member 38, as shown in Figure 13. The salt bar will be held in contact with the portion 43 of the cloth element 36 by means of a spring 42, secured to a spring support 40, mounted in the member 38, as best shown in Figure 13. The assembled U-shaped member 38, cloth element 36, and salt bar 20, are then inserted into the holder 37 until the closed end of the cloth element 36 engages the bottom wall 44 of the holder 37. The upper end of the holder 37 is preferably open as shown in Figure 12, so as to permit the inner member 38 to be inserted therein.

The above described device has been found very useful in that the cloth element 36, when it becomes worn from contacting with the surface of the windshield glass, may readily be shifted to present a new surface, thereby greatly lengthening the life of the device. The cloth is interposed between the salt bar and the surface of the windshield glass, as shown and described with reference to the previous figures.

The device shown in Figures 16, 17, and 18 makes use of a flat piece of cloth 46, adapted to be demountably secured in the holder 47 by means of a U-shaped member 48, having its side walls provided with a plurality of spaced teeth 49 adapted to pierce the fabric or cloth and slide in longitudinally extending grooves 51, provided in the opposite walls of the U-shaped member 47. A suitable spring 52 holds the salt bar 20 in contact with the cloth 46, as particularly shown in Figures 16 and 17. In the form here shown, the cloth is first secured to the inner U-shaped member 48, after which the latter is inserted into the holder 47, to the position shown in Figure 16.

The novel attachment featured in this invention has been found particularly useful in connection with ordinary types of windshield cleaners to remove sleet and ice from a windshield. The fabric or cloth 18 is adapted to be held in wiping contact with the glass of the windshield by the tension member 26, which constantly forces the salt bar against the cloth so that the salt bar, as it slowly dissolves, will saturate the fabric or cloth 18, causing a salty solution to be transferred onto the surface of the windshield glass which will tend to melt the sleet and ice accumulating thereon, as the holder is moved backwardly and forwardly over the surface of the windshield glass simultaneously with the wiper element of the windshield cleaner. The accumulation of sleet and ice on the windshield will tend to dissolve the salt bar, which will cause the fabric 18 to become saturated with a salty solution, as above stated, which will quickly dissolve or melt the ice and sleet on the surface of the windshield, and thereby maintain clear vision for the driver. The fabric closure or cloth 18 also prevents rapid wearing of the salt bar so that the latter will give long service before replacement is necessary. When it becomes necessary to insert a new salt bar in the holder, the fabric 18 is detached therefrom by swinging the latch member 21 from the full to the dotted line position, shown in Figure 3, whereupon a salt bar may be conveniently inserted into the holder. The closure 18 may also be readily replaced, when it becomes worn as a result of contacting with the surface of the windshield glass.

We claim as our invention:

1. An attachment for a windshield cleaner, comprising a soluble body, an open sided holder therefor, a porous textile element attached to the holder and forming a closure for the open side thereof, and means for holding said soluble body in engagement with said porous element independently of the glass of the windshield.

2. An attachment for a windshield cleaner, comprising a salt bar, an open sided holder therefor, a porous fabric forming a closure for the open side of said holder and adapted to contact with the glass of a windshield, and means within the holder for holding said soluble body in yielding contact with said closure.

3. An attachment for a windshield cleaner, comprising a salt bar, an open sided holder therefor, provided with means for attaching it to a windshield cleaner, a flexible porous closure for the open side of said holder, means for detachably securing said closure to the holder, and means within the holder for exerting a yielding pressure against said salt bar to hold the porous closure in yielding contact with the glass of a windshield.

4. An attachment for a windshield cleaner, comprising a salt bar, an open sided holder therefor, having means for attaching it to a windshield cleaner, a cloth closure for the open side of said holder provided with longitudinally extending marginal reinforcing members, ribs on the side walls of said holder adapted to be engaged by said reinforcing members to support the closure on said holder, means for removably securing said reinforcing members to said holder whereby the closure may be detached therefrom, and means for exerting a yielding pressure against said salt bar to hold the latter in contact with the inner surface of said closure, and whereby the latter may be held in contact with the glass of a windshield.

5. An attachment for a windshield cleaner, comprising a salt bar, an open sided holder therefor, having means for attaching it to a windshield cleaner, a cloth closure for the open side of said holder provided with longitudinally extending marginal reinforcing members, ribs on the side walls of said holder adapted to be engaged by said reinforcing members, lugs on one of said walls cooperating with one of said ribs to secure one of said reinforcing members to the holder, to support the closure on said holder, a latch member engageable with the other of said reinforcing members to demountably secure it to said holder whereby the closure may be removed therefrom, and means for exerting a yielding pressure against said salt bar to hold the latter in contact with said closure whereby the closure may be held in yielding contact with the surface of a windshield glass.

In witness whereof, we have hereunto set our hands this 30th day of November, 1928.

PATRICK H. HARRINGTON.
VICTOR KLINGLER.